(12) United States Patent
Hu

(10) Patent No.: US 8,269,733 B2
(45) Date of Patent: Sep. 18, 2012

(54) INPUT PRECISION

(75) Inventor: Wanhua Hu, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 726 days.

(21) Appl. No.: 12/399,475

(22) Filed: Mar. 6, 2009

(65) Prior Publication Data

US 2009/0225053 A1 Sep. 10, 2009

(30) Foreign Application Priority Data

Mar. 6, 2008 (JP) ................................. 2008-056494

(51) Int. Cl.
*G06F 3/041* (2006.01)
*G09G 5/08* (2006.01)
*G06F 3/033* (2006.01)
(52) U.S. Cl. .......................... 345/173; 345/157; 345/160
(58) Field of Classification Search .................... 345/173
See application file for complete search history.

(56) References Cited

U.S. PATENT DOCUMENTS

| 7,489,306 | B2 * | 2/2009 | Kolmykov-Zotov et al. . | 345/173 |
| 7,577,924 | B2 * | 8/2009 | Nguyen ........................ | 715/863 |
| 2003/0080947 | A1 * | 5/2003 | Genest et al. ................. | 345/173 |
| 2007/0257891 | A1 * | 11/2007 | Esenther et al. ............. | 345/173 |
| 2008/0309626 | A1 * | 12/2008 | Westerman et al. .......... | 345/173 |

FOREIGN PATENT DOCUMENTS

| JP | 7-073009 | 3/1995 |
| JP | 8-234909 | 9/1996 |
| JP | 2000-181613 | 6/2000 |
| JP | 2000-181630 | 6/2000 |
| JP | 2001-092580 | 4/2001 |
| JP | 2004-038503 | 2/2004 |
| JP | 2005-173934 | 6/2005 |
| JP | 2007-207281 | 8/2007 |

OTHER PUBLICATIONS

Japanese Patent Office issued a Japanese Office Action dated Jan. 27, 2010, Application No. 2008-056494.

* cited by examiner

*Primary Examiner* — Joseph Haley
*Assistant Examiner* — Nicholas Lee
(74) *Attorney, Agent, or Firm* — Young & Thompson

(57) ABSTRACT

An improved input precision touch panel having a sensor for detecting external pressure exerted on a display. The display displays an object icon, first auxiliary icon that corresponds to a detection area on which the sensor detects the pressure. On the display, the size of the first auxiliary icon is greater than the object icon and a second auxiliary icon corresponds to a second detection area, with the size of the second auxiliary icon greater than that of the object icon. Upon detection of external pressure an operation signal output unit outputs different operation signals according to positional relationships of a pressure-detected position on which the sensor detected the external pressure, in correspondence to a display position of the first auxiliary icon and a display position of the second auxiliary icon displayed by the display unit.

18 Claims, 12 Drawing Sheets

INPUT PRECISION

This application is based upon and claims the benefit of priority from Japanese patent application No. 2008-056494, filed on Mar. 6, 2008, the disclosure of which is incorporated herein in its entirety by reference.

BACKGROUND OF THE INVENTION

1. Field of the Invention

The present invention relates to an input apparatus, an input method and an input program.

2. Description of the Related Art

In general, a piece of information is inputted into an information processing apparatus such as a computer via a pointing device such as a mouse or a keyboard so that a user can operate the information displayed on the display of the information processing apparatus. In addition, in the case where the display has a touch panel function, the user inputs information by touching an icon or the like displayed on the display.

The mouse has a plurality of buttons to process different functions in response to the operation of either button. For example, in the case of a mouse having buttons on either side, a left-clicking action or an action of pressing the left button initiates a specific action. In addition, a right-clicking action or an action of pressing the right button initiates an optional action. The optional action allows the user to select one or more auxiliary functions before initiating the specific action. For example, it is possible to operate a scroll bar for varying the vertical or horizontal width of an operation screen using a soft key, which is realized by software. This makes it possible to provide a more convenient function to the user, Recently, typical touch panels introduced for typical store-installed terminals are increasing. Such a touch panel initiates only one action when the user touches a screen. For example, while the touch screen can perform a simple specific action in response to pressing a displayed soft key, it cannot initiate an optional action for providing auxiliary functions such as the right-clicking on the mouse as mentioned above.

In order to avoid such problems, several techniques for performing multiple processes using a touch panel have been proposed.

For example, as disclosed in Japanese Published Unexamined Application Patent No. 2007-207281, consideration is given to an information input/output apparatus that outputs control signals in accordance with the number of positions on which pressure is detected when pressure is applied to a plurality of positions on a touch panel. This information input/output apparatus can initiate a plurality of actions when the actions of the information input/output apparatus are set to match the number of the positions on which pressure is detected.

In addition, as disclosed in for example Japanese Published Unexamined Application Patent No. 2000-181630, consideration is given to a touch panel system that initiates a predetermined action when pressure is applied to a position different from the current position of a pointer in the state where the position indication is being performed by the pointer.

However, the technique disclosed in Japanese Published Unexamined Application Patent No. 2007-207281 has a problem in that an intended action cannot be performed when a user does not correctly remember the operation that corresponds to the number of detected positions. In addition, there is another problem in which, when the intended action has a number of alternatives, the numbers of detected positions are required to be set to match all the alternatives.

Further, the technique disclosed in Japanese Published Unexamined Application Patent No. 2000-181630 has a problem in which, when pressure is not applied to a correct position on the touch panel, the intended action cannot be performed.

In addition, according to the techniques disclosed in Japanese Published Unexamined Application Patent No. 2007-207281 and Japanese Published Unexamined Application Patent No. 2000-181630, the above-mentioned position for initiating an intended action is not displayed Therefore, as a drawback, it is difficult for the user to identify an area on the touch panel that he/she is supposed to press.

Furthermore, according to the techniques disclosed in Japanese Published Unexamined Application Patent No. 2007-207281 and Japanese Published Unexamined Application Patent No. 2000-181630, when the user presses the touch panel using a finger or the like, an operation signal for initiating a specific action is outputted with reference to the entire area on which pressure is applied. Thus, as a drawback, operation is difficult in the case where a high precision operation is performed with reference to a certain position on which pressure is detected such as a list box and a scroll bar.

[Patent Document 1] Japanese Published Unexamined Application Patent No. 2007-207281

[Patent Document 2] Japanese Published Unexamined Application Patent No. 2000-181630

SUMMARY OF THE INVENTION

An aspect of the present invention is to provide an input apparatus, an input method and an input program, which can overcome the foregoing problems. According to an aspect of the present invention, there is provided an input apparatus for receiving input data in response to user operation. The input apparatus may include a sensor for detecting external pressure; a display unit for displaying an object icon to be processed in response to pressing the sensor, a first auxiliary icon corresponding to a first detection area on which the sensor detects the pressure, with the size of the first auxiliary icon greater than that of the object icon, and a second auxiliary icon corresponding to a second detection area, with the size of the second auxiliary icon greater than that of the object icon, and an operation signal output unit for outputting different operation signals according to positional relationships of a pressure-detected position, on which the sensor detected the external pressure, in relation with a display position of the first auxiliary icon and a display position of the second auxiliary icon displayed by the display unit.

According to another aspect of the present invention, there is provided a method for inputting data into an input apparatus, which has a sensor for detecting external pressure. The method may include steps of: displaying an object icon to be processed in response to pressing on the sensor, a first auxiliary icon corresponding to a first detection area on which the sensor detects the pressure, with the size of the first auxiliary icon greater than that of the object icon, and a second auxiliary icon corresponding to a second detection area, with the size of the second auxiliary icon greater than that of the object icon; and outputting different operation signals according to positional relationships of a pressure-detected position, on which the sensor detected the external pressure, in relation with a display position of the first auxiliary icon and a display position of the second auxiliary icon displayed in the displaying.

According to a further aspect of the present invention, there is provided a record medium having recorded thereon a computer-readable program for running an operation signal output process on a computer. The program may include procedures of: displaying an object icon to be processed in response to pressing on the sensor, a first auxiliary icon corresponding to a first detection area on which the sensor detects the pressure, with the size of the first auxiliary icon greater than that of the object icon, and a second auxiliary icon corresponding to a second detection area, with the size of the second auxiliary icon greater than that of the object icon; and outputting different operation signals according to positional relationships of a pressure-detected position, on which the sensor detected the external pressure, in relation with a display position of the first auxiliary icon and a display position of the second auxiliary icon displayed in the displaying.

According to a further another aspect of the present invention, there is provided an input apparatus for receiving input data in response to user operation. The input apparatus may serve to display an object icon to be processed in response to pressing on the sensor, wherein the sensor detects external pressure, a first auxiliary icon corresponding to a first detection area on which the sensor detects the pressure, with the size of the first auxiliary icon greater than that of the object icon, and a second auxiliary icon corresponding to a second detection area, with the size of the second auxiliary icon greater than that of the object icon; and to output different operation signals according to positional relationships of a pressure-detected position, on which the sensor detected the external pressure, in relation with a display position of the first auxiliary icon and a display position of the second auxiliary icon displayed by the display unit.

The construction as set forth above makes it possible to increase the number of actions, which can be indicated by operation on the touch panel. Furthermore, the user can easily identify an area on the touch panel, to which pressure is supposed to be applied in order to run an intended operation. The above and other objects, features, and advantages of the present invention will become apparent from the following description with reference to the accompanying drawings which illustrate an example of the present invention.

EXEMPLARY EMBODIMENT

Hereinafter, an input apparatus (including an input method and program) according to the present invention will be described with reference to the accompanying drawings, in which exemplary embodiments thereof are shown.

Figure 1:
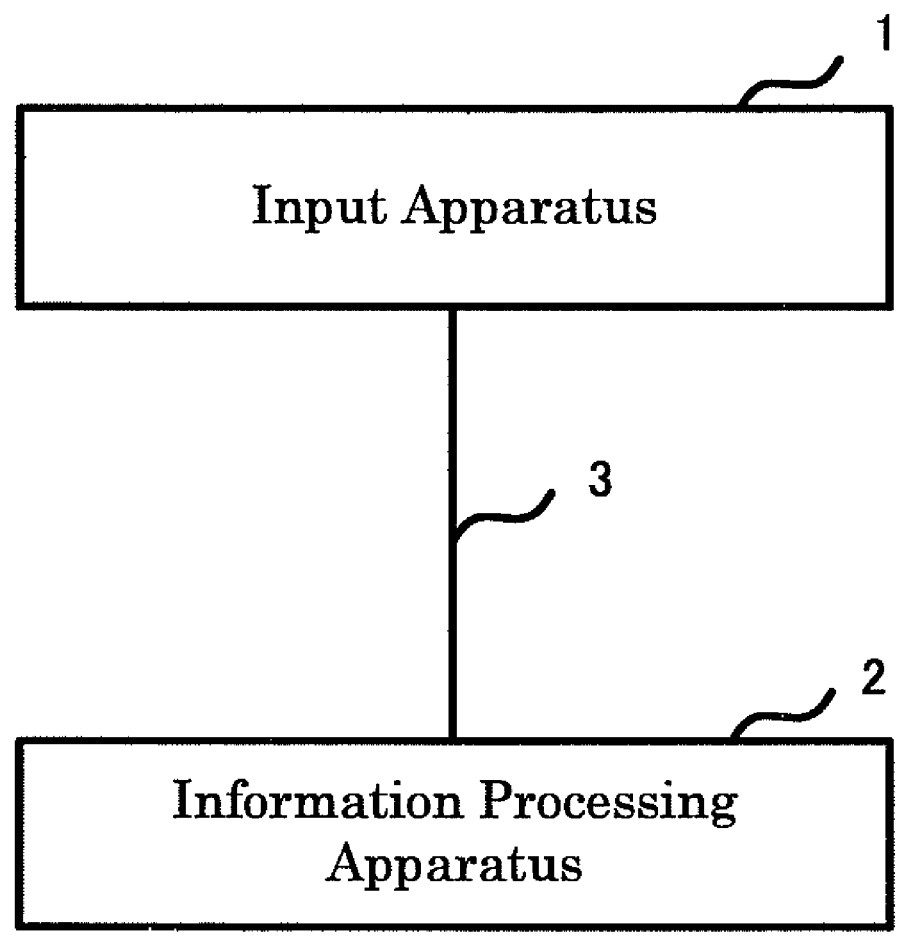
FIG. 1 is a block diagram illustrating an input apparatus according to an embodiment of the present invention and an information processing apparatus connected to the input apparatus of the present invention.

As shown in FIG. 1, an input apparatus 1 of this embodiment is connected to information processing apparatus 2 via data line 3.

Input apparatus 1 receives input data in response to user operation, and sends the input data to information processing apparatus 2 via data line 3. Input apparatus 1 also functions as a man-machine interface that displays a variety of data to request inputs from the user.

Information processing apparatus 2 is implemented as, for example, a Personal Computer (PC). Information processing apparatus 2 is connected to input apparatus 1, receives an operation signal sent from input apparatus 1, and performs a predetermined action.

Now, a detailed description will be made of the outer configuration of input apparatus 1.

Figure 2A:
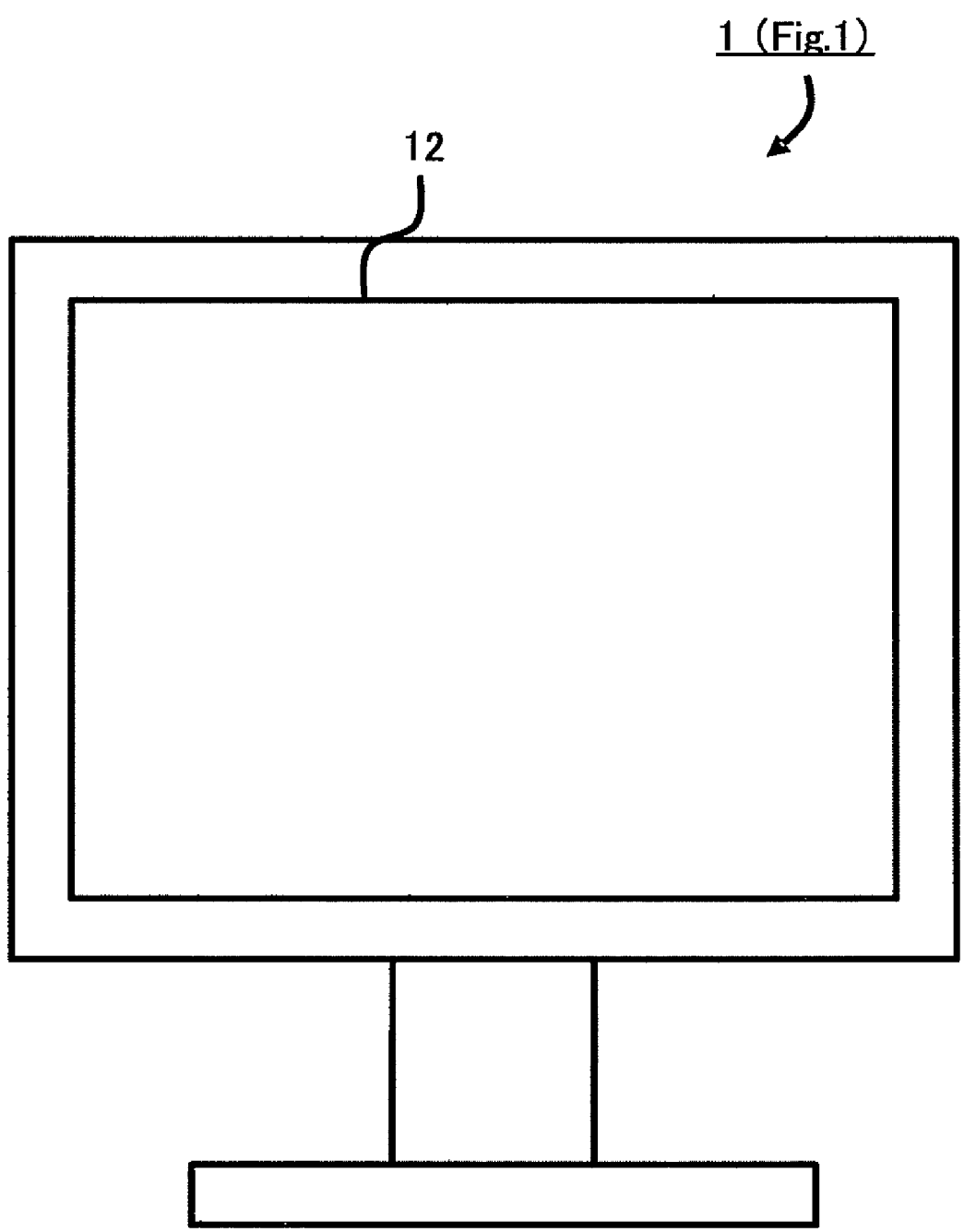
FIG. 2A is a front elevation view illustrating the exterior of the input apparatus shown in FIG. 1.

As shown in FIG. 2A, when viewed from the front, input apparatus 1 has detection unit 12.

Figure 2B:
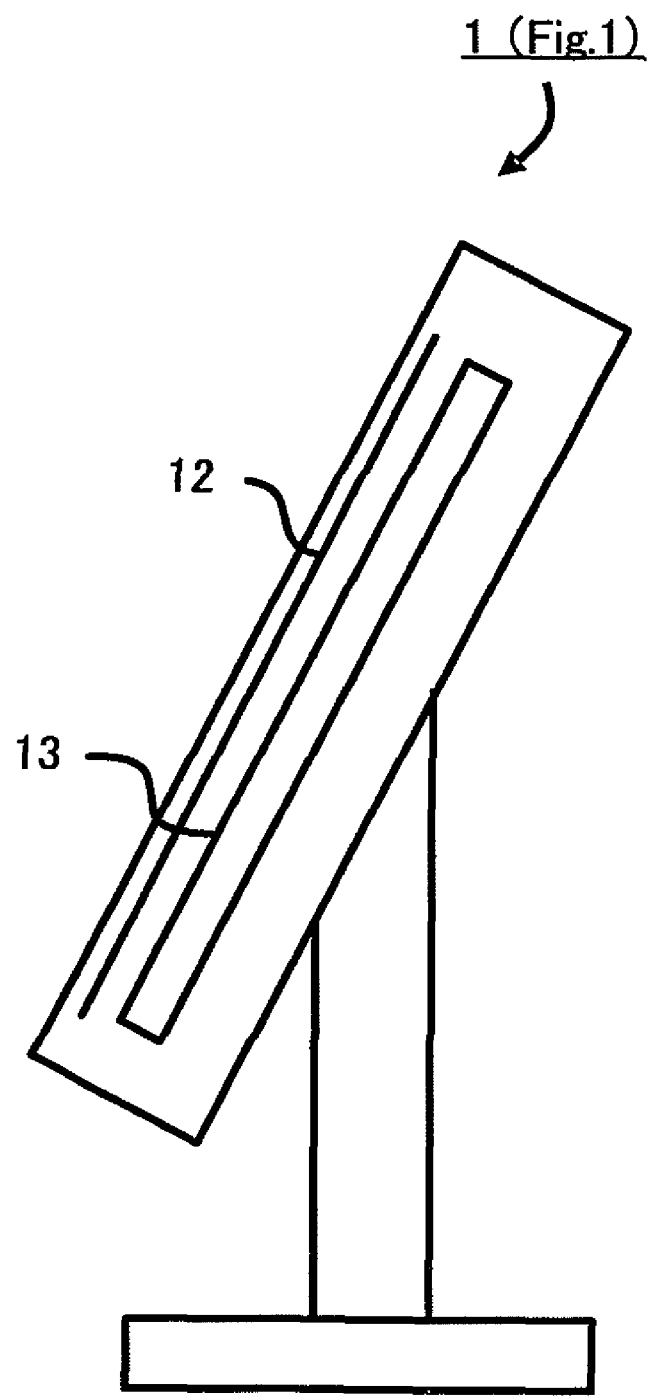
FIG. 2B is a side elevation view illustrating the input apparatus shown in FIG. 1.

In addition, as shown in FIG. 2B, when the cross section of input apparatus 1 is viewed from the side, detection unit 12 is arranged in front of and in parallel with display unit 13.

Detection unit 12 performs a "detection step" and is implemented as a "sensor" that detects a change in voltage, which is caused by pressure applied on a touch panel.

Detection unit 12 outputs a "pressure detection signal" indicating the detection of external pressure.

In this embodiment, the sensor of the detection unit 12 is implemented as a touch pane. The touch panel used herein operates in a typical operation mode.

Display unit 13 constitutes, together with detection unit 12, the touch panel, and displays an arbitrary piece of data.

Figure 3:
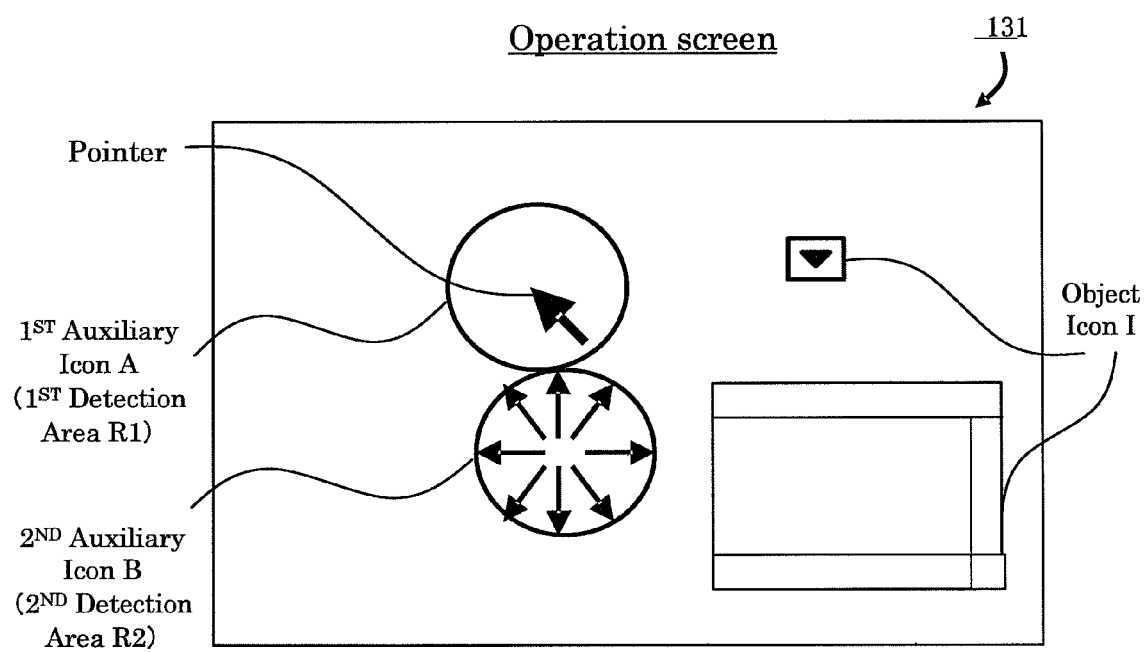
FIG. 3 illustrates an example configuration of an operation screen for displaying first and second auxiliary icons.

For example, as shown in FIG. 3, display unit 13 displays operation screen 131 showing first auxiliary icon A and second auxiliary icon B.

"First auxiliary icon A" is a marker image for indicating an area on the touch panel to which external pressure will be applied (hereinafter, referred to as "first detection area R1") in order to output a first operation signal. The first operation signal will be described later.

First auxiliary icon A is expressed by a circle and an arrow (hereinafter, referred to as a "pointer") enclosed by a circle. The leading end of the arrow (pointer) is designed to point out an object that will be selected when the first auxiliary icon is pressed.

The first auxiliary icon A has a predetermined size (hereinafter, referred to as "first size"). The first size can be any size as long as the user can easily operate it.

As long as the first size is greater than an icon I supposed to be processed in response to operation on the touch panel (pressing on the sensor) (hereinafter, referred to as an "object icon I") of icons displayed on the display unit 13, it can be several times (for example, two times) the size of object icon I as shown in FIG. 3. Thus, first auxiliary icon A can enclose object I.

In addition, the first size can be for example three times the width of the finger of the user in both the longitudinal and transverse direction. Further, the shape of first auxiliary icon A is not limited to a circle but can be a diagram such as a polygon or a pattern.

The "second auxiliary icon B" is a marker image for indicating an area on the touch panel to which external pressure will be applied (hereinafter, referred to as "second detection area R2")in order to output a second operation signal. The second operation signal will be described later.

The second auxiliary icon B is expressed by a circle and a plurality of arrows radially extending from the center of the circle, wherein the arrows are arrayed with regular angular intervals. The arrows are designed to point out movable directions of first auxiliary icon A when the user operates first auxiliary icon A to move.

Second auxiliary icon B has a predetermined size (hereinafter, referred to as "second size "). The second size can also be any size as long as the user can easily operate it.

As long as the second size is greater than object icon I shown in FIG. 3, it can be several times (for example, two times) the size of object icon I. Thus, second auxiliary icon B can also enclose object icon I.

In addition, the second size can be for example three times the width of a finger of the user in both the longitudinal and transverse direction. Further, the shape of second auxiliary icon B is not limited to a circle but can be any shape.

In the state where neither first auxiliary icon A nor second auxiliary icon B is displayed, display unit 13 displays first auxiliary icon A and second auxiliary icon B in response to pressure applied to two different points of the touch panel (the detection unit 12). The positions on which first and second auxiliary icons A and B are displayed are not specifically limited. For example, these positions can be set as default so as to display first and second auxiliary icons A and B on positions corresponding to one of the two points to which pressure is applied.

Now, a description will be made of the internal construction of the input apparatus 1.

Figure 4:
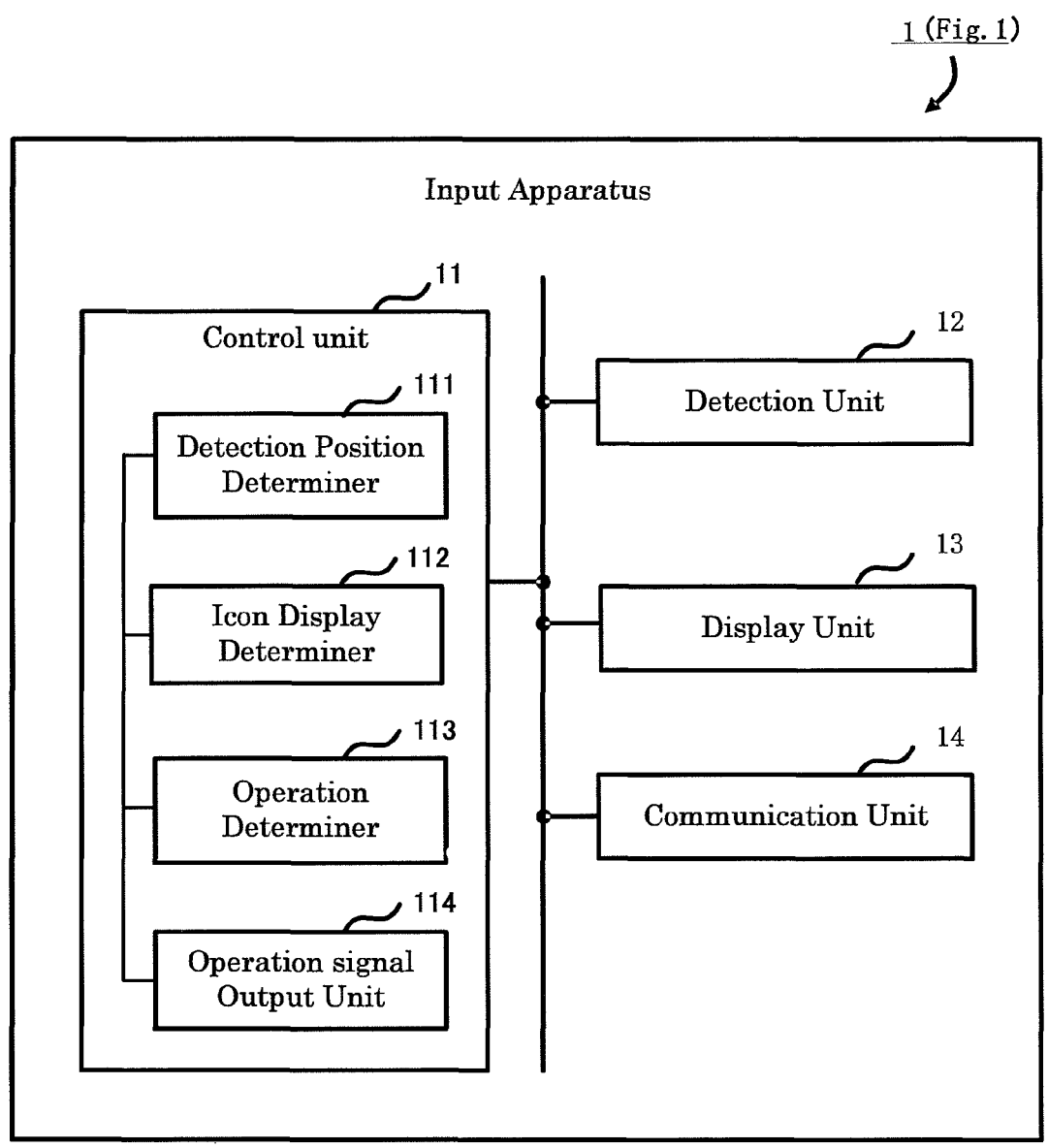
FIG. 4 is a block diagram illustrating the construction of the input apparatus shown in FIG. 1.

As shown in FIG. 4, input apparatus 1 also includes, in addition to detection unit 12 and display unit 13 shown in FIG. 2B, control unit 11 and communication unit 14.

Control unit 11 is implemented for example as a microprocessor module, and controls all the parts of input apparatus 1.

Control unit 11 includes detection position determiner 111, icon display determiner 112, operation determiner 113 and operation signal output unit 114.

Detection position determiner 11I performs a "detection position determining step" to determine one or more positions on which detection unit 12 detects pressure (hereinafter, referred to as "detected positions") based on the pressure detection signal inputted from detection unit 12.

Detection position determiner 111 also performs a "pressure input determining step" to determine whether or not the pressure detection signal is inputted from detection unit 12.

In addition, detection position determiner 111 performs a "detection position counting step" to count the number of positions on which pressure is detected (hereinafter, referred to as "number of pressure-detected positions").

Icon display determiner 112 performs an "icon display determining step" to determine whether or not display unit 13 is displaying first and second auxiliary icons A and B.

The operation determiner 113 performs a "operation determining step" to determine the positional relationships of one or more pressure-detected positions on the touch panel, determined by the detection position determiner 111, in relation with a position on which first auxiliary icon A is displayed (first detection area R1) and a position on which second auxiliary icon B is displayed (second detection area R2).

Operation signal output unit 114 performs an "operation signal output step" to output predetermined operation signals corresponding to the positional relationships determined by operation determiner 113.

For example, when pressure is applied to only the position on which the first auxiliary icon is displayed (first detection area R1), operation signal output unit 114 performs a "first operation signal output step" to output first output signal OS1. The signal format of first operation signal OS1 is not specifically limited. The content indicated by "first operation signal OS1" can be for example "a specific action initiated" by left-clicking on a typical pointing device such as a mouse.

In addition, for example, when both the position on which first auxiliary icon A is displayed (first detection area R1) and the position on which second auxiliary icon B is displayed (second detection area R2) are pressed by the user or the like (with, for example, two fingers), operation signal output unit 114 performs a "second operation signal output step" to output second operation signal OS2.

The signal format of second operation signal OS2 is not specifically limited. In addition, herein, the content indicated by "second operation signal OS2" can be for example "an optional action initiated" by right-clicking on a typical mouse In the meantime, pressure can be applied at the same time to both the position on which first auxiliary icon A is displayed (first detection area R1) and the position on which second auxiliary icon B is displayed (second detection area R2). Alternatively, in the state where one of the first and second detection areas RI and R2 is already under pressure, the other one of the first and second detection areas R1 and R2 can be sequentially pressed.

In addition, for example, when pressure is applied to the position on which second auxiliary icon B is displayed (second detection area R2), operation signal output unit 114 performs a "movement operation signal output step" to output a movement operation signal MS that instructs to move the first auxiliary icon A.

When pressure is applied to an area except for the position on which first auxiliary icon A is displayed (first detection area R1) and an area except for the position on which second auxiliary icon B is displayed (second detection area R2), operation signal output unit 114 performs an icon display end signal output step to output an icon display end signal ES. In this case, display unit 13 stops displaying first and second auxiliary icons A and B.

Communication unit 14 is implemented as, for example, a communication module, and sends/receives data to/from information processing apparatus 2. For example, communication unit 14 sends first operation signal OS1, second operation signal OS2, movement operation signal MS and icon display end signal ES from operation signal output unit 114 to information processing apparatus 2.

Now, a description will be made of an operation-response process in which input apparatus 1 having the above-described construction outputs an operation signal according to input operation.

Figure 5:
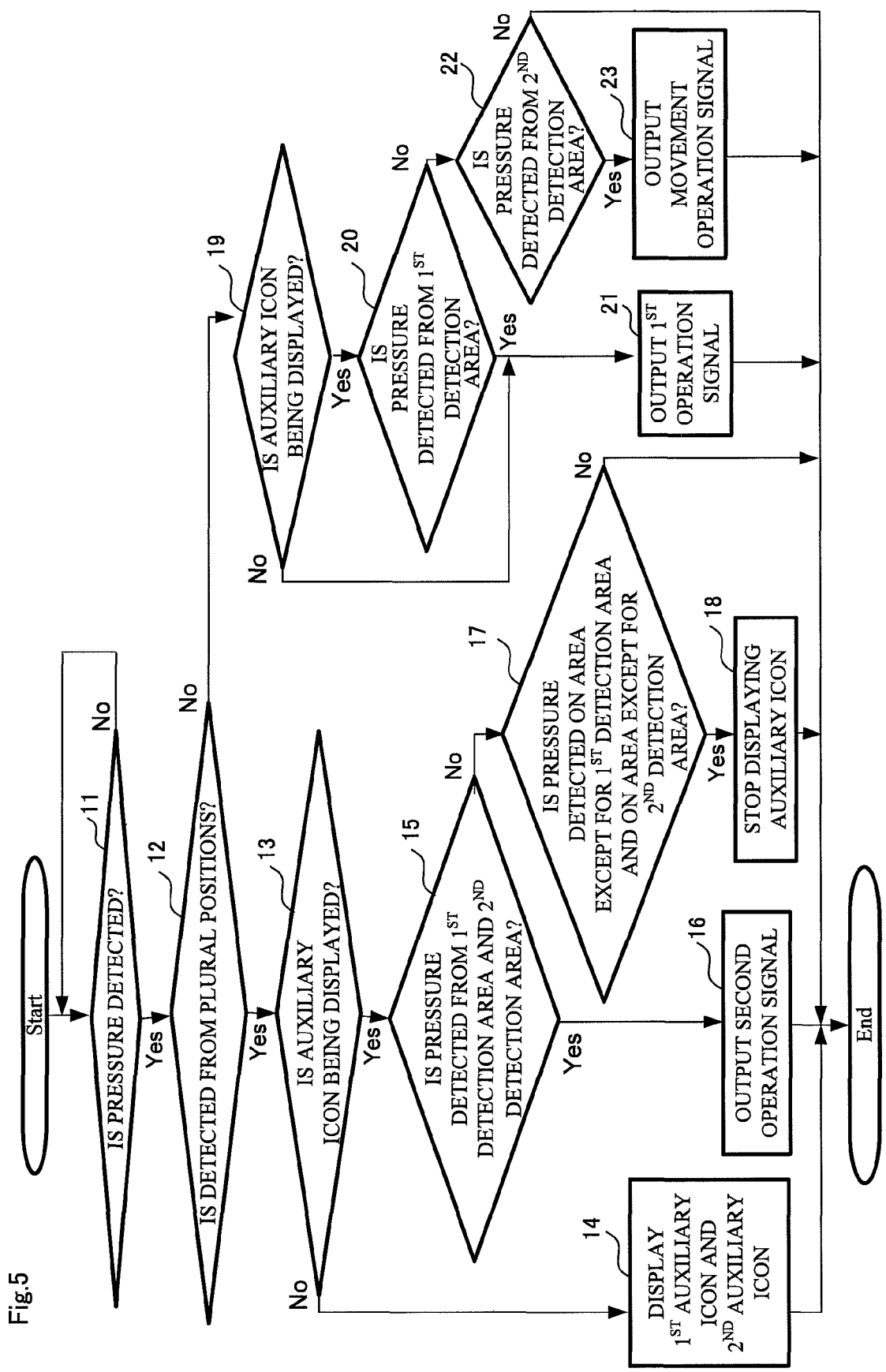
FIG. 5 is a flowchart illustrating an operation-response process by the input apparatus.
Figure 6A:
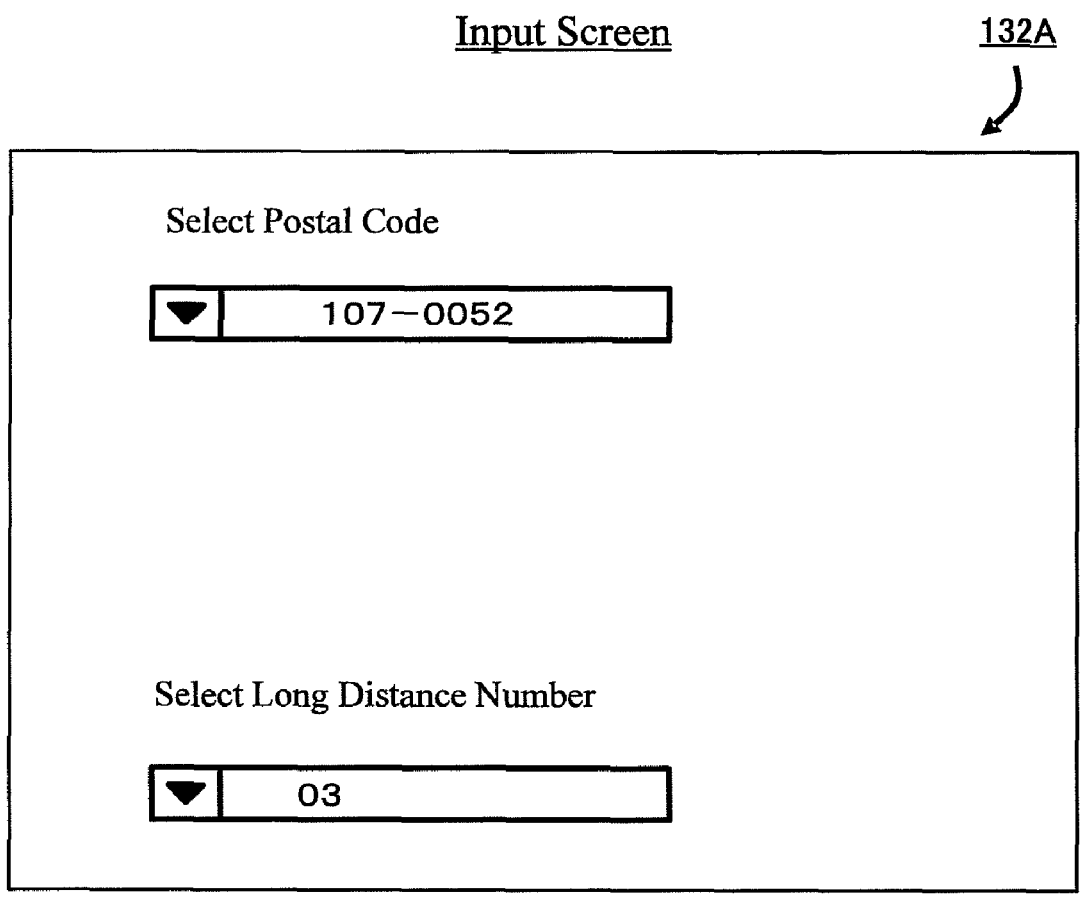
FIG. 6A illustrates an example configuration of an input screen before first and second auxiliary icons are displayed.

In the following description, it shall be assumed that input apparatus 1 is powered on in a disclosure with reference to FIG. 5 and that display unit 13 displays only a postal code and telephone number input screen 132A in a disclosure with reference to FIG. 6A. In addition, in this state, it shall be assumed that display unit 13 displays neither first auxiliary icon A nor second auxiliary icon B.

Detection position determiner 111 determines whether or not a pressure detection signal is inputted from detection unit 12 (i.e., whether or not detection unit 12 detected pressure) by performing a "pressure input determining step" (step 11).

When it is determined that pressure is not detected (No in step 11), detection position determiner 111 stands by until pressure is detected and until the pressure detection signal is inputted by detection unit 12.

In the meantime, it shall be assumed that the user pressed one position on the touch panel with a finger or the like. In this case, detection unit 12 detects pressure applied from the outside and outputs a pressure detection signal. Detection position determiner 111 determines that the pressure detection signal is inputted (Yes in step 11).

Then, detection position determiner 111 counts the number of pressure-detected positions and determines whether or not the counted number is plural by performing a "detection position counting step" (step 12).

Below, description will be given of a case where the number of pressure-detected positions is determined to be plural in the "detection position counting step" (Yes in step 12).

When the number of pressure-detected positions is determined to be plural (Yes in step 12), icon display determiner 112 determines whether or not display unit 13 is displaying an auxiliary icon by performing an "icon display determining step" (step 13).

Figure 6B:
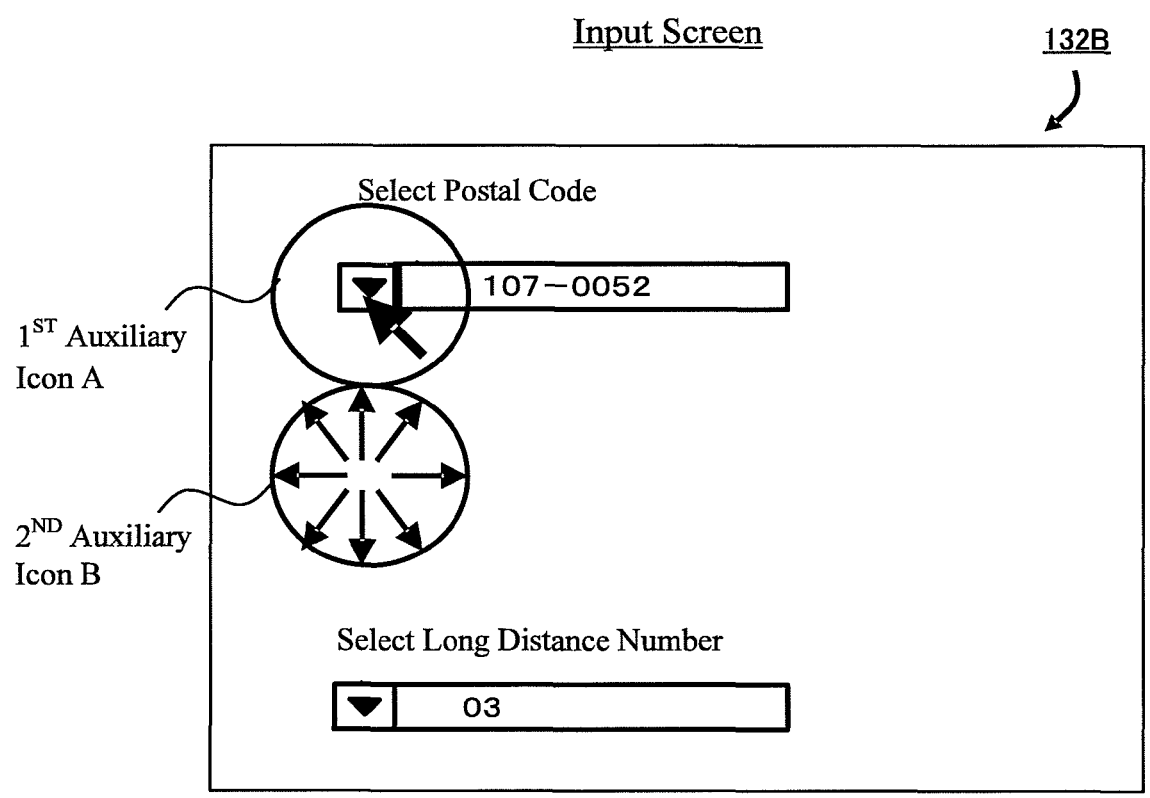
FIG. 6B illustrates an example configuration of an input screen when first and second auxiliary icons are displayed.

When it is determined that display unit 13 is not displaying an auxiliary icon (No in step 13), display unit 13 displays first auxiliary icon A and second auxiliary icon B on input screen 132B, as shown in FIG. 6B, by performing a "displaying step" (step 14). First auxiliary icon A and second auxiliary icon B can be initially displayed on one of a plurality of pressure-detected positions determined by detection position determiner 111.

In the case where the number of pressure-detected positions is determined plural, when icon display determiner 112 determines that auxiliary icons A and B are being displayed (Yes in step 13), operation determiner 113 determines the positional relationship among the pressure-detected positions that is determined by detection position determiner 111, the position on which first auxiliary icon A is displayed (first detection area R1) and the position on which second auxiliary icon B is displayed (second detection area R2) by performing a "operation determining step" (step 15).

It shall be assumed that the user simultaneously pressed both first auxiliary icon A and second auxiliary icon B with two fingers. Then, operation determiner 113 determines that the pressure-detected positions are the position on which first auxiliary icon A is displayed (first detection area R1) and the position on which second auxiliary icon B is displayed (second detection area R2) (Yes in step 15).

Operation signal output unit 114 outputs a second operation signal that gives instructions to "initiate an optional action" corresponding to right-clicking on a typical mouse by performing a "second operation signal output step".

Figure 7A:
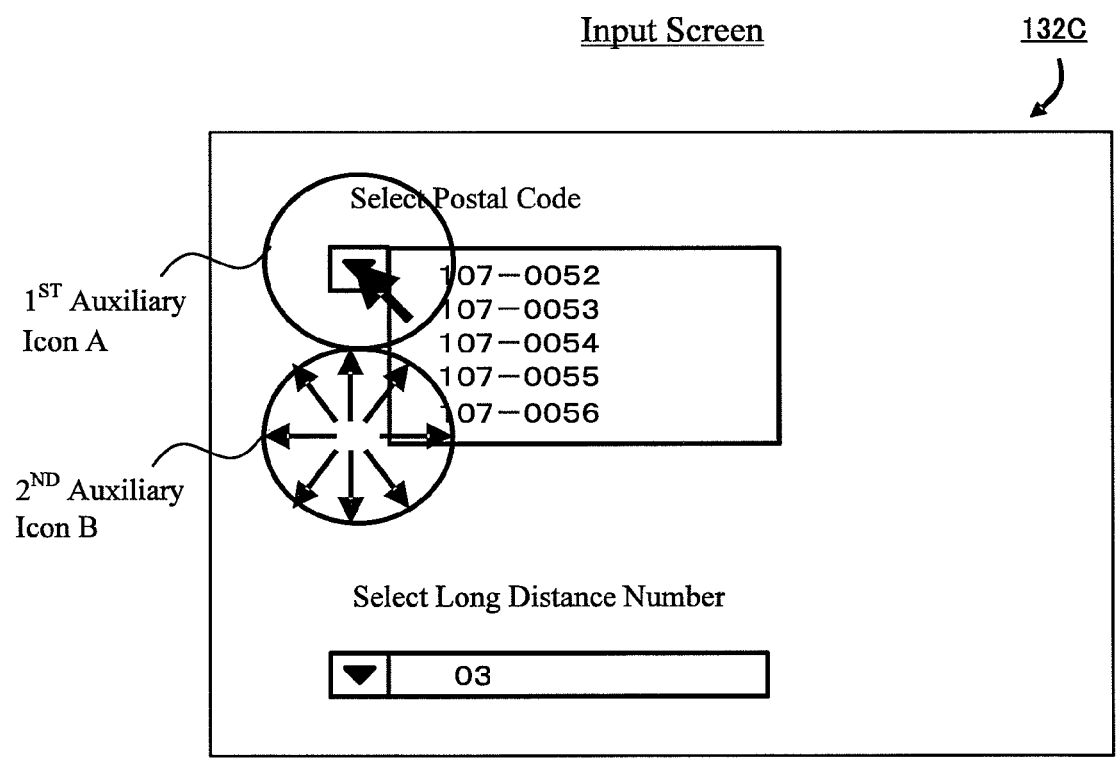
FIG. 7A illustrates an example configuration of an input screen when a first operation signal is outputted.
Figure 7B:
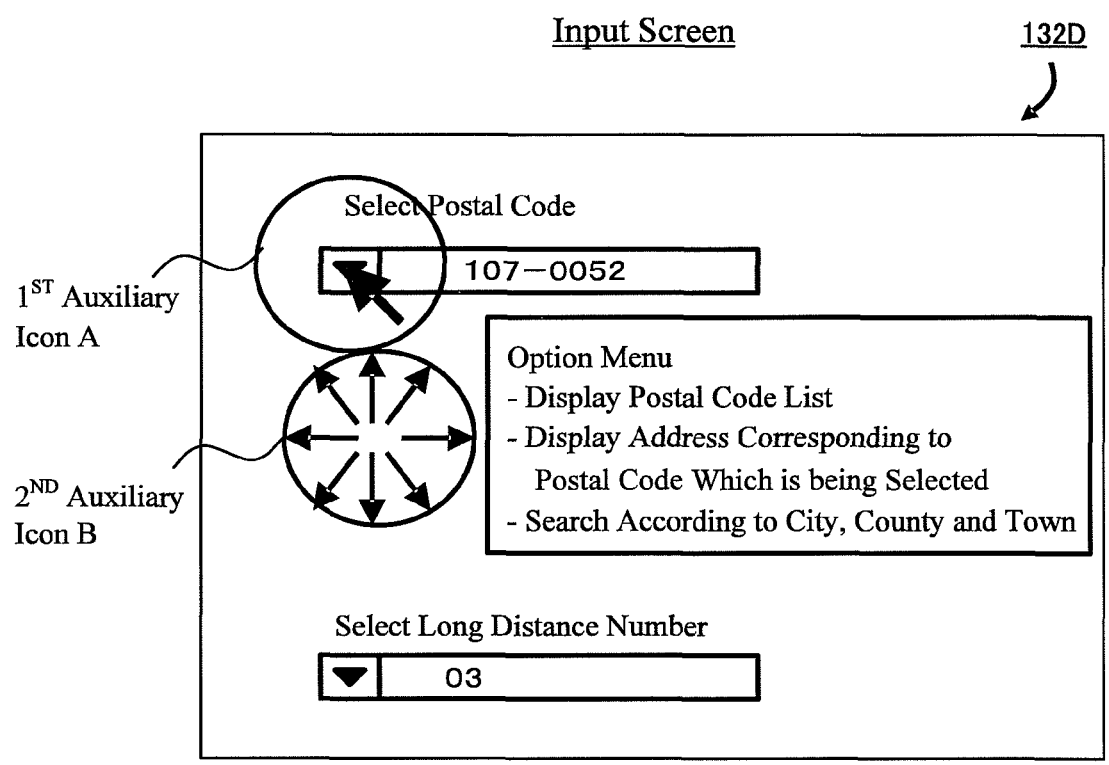
FIG. 7B illustrates an example configuration of an input screen when a second operation signal is outputted.

As second operation signal OS2 is sent to information processing apparatus 2, an option menu is displayed on, for example, input screen 132D as shown in FIG. 7B.

In the meantime, operation determiner 113 determines that the pressure-detected positions constitute an area, that excludes the position on which first auxiliary icon A is displayed (first detection area R1) and, at the same time, constitute an area, that excludes the position on which second auxiliary icon B is displayed (second detection area R2). It shall be assumed "Yes" in step 17.

Then, operation signal output unit 114 outputs icon display end signal ES by performing an "icon display end signal output step". Display unit 13 stops displaying first and second auxiliary icons A and B (step 18) In the meantime, when it is determined that pressure is not being applied at the same time to both an area that exclude first detection area R1 and second detection area R2, the control unit 11 terminates the operation-response process.

Next, description will be given of a case where detection position determiner 111 determines that the number of pressure-detected positions is not plural (i.e., the number of pressure-detected positions is "1" in the "detection position counting step" (No in step 12).

When it is determined that the number of pressure-detected positions is not plural (No in step 12), icon display determiner 112 determines whether or not first and second auxiliary icons A and B are being displayed by performing an "icon display determining step" (step 19). When it is determined that first and second auxiliary icons A and B are not being displayed (No in step 19), this state is consistent with the state where an operation on a typical mouse (left-clicking) is performed. Thus, operation signal output unit 114 outputs a first operation signal OS1 corresponding to left-clicking on a typical mouse.

Otherwise, icon display determiner 112 determines that first and second auxiliary icons A and B are being displayed. It shall be assumed Yes in step 19. In this case, the operation determiner 113 determines the positional relationship among the pressure-detected positions on the touch panel that is determined by the detection position determiner 111, the current position of the position on which the first auxiliary icon A is displayed (first detection area R1) and the current position of the position on which the second auxiliary icon B is displayed (second detection area R2) by performing a "operation determining step" (step 20).

It shall be assumed that pressure is applied to first detection area R1 on the touch panel by, for example, the operation of the user. For example, it shall be assumed that the user clicked or double clicked the position, on which first auxiliary icon A is being displayed, with a finger.

Then, operation determiner 113 determines that pressure is detected from first detection area R1 since the position on which pressure is detected is identical to first detection area R1 (i.e., the position on which first auxiliary icon A is being displayed) (Yes in step 20).

The operation signal output outputs a first operation signal OS1 giving instructions to "initiate a specific action" corresponding to left-clicking on a typical mouse by performing a "first operation signal output step" (step 21).

As shown in FIG. 6B, in the state where the leading end of the arrow (pointer) indicated by first auxiliary icon A is over-lapped with a list box in input screen 132B, it shall be assumed that the user clicked the position on which first auxiliary icon A is displayed (first detection area R1). Then, information processing apparatus 2 initiates, when first operation signal OS1 has been received, a specific action for pressing a button in the list box. Referring to input screen 132C shown in FIG. 7A, a pull-down menu is displayed on the position indicated by the arrow.

In the meantime, when the pressure-detected position is not identical to the position on which first auxiliary icon A is displayed (first detection area R1) (No in step 20), operation determiner 113 determines whether or not the pressure-detected position is identical to the position on which second auxiliary icon B is displayed (second detection area R2) by performing an "operation determining step" (step 22).

In this case, it shall be assumed that second detection area R2 on the touch panel is pressed by, for example, a user operation. Then, since the pressure-detected position is identical to the position on which second auxiliary icon B is displayed, operation determiner 113 determines that pressure is detected from second detection area R2 (Yes in step 22).

Figure 8A:
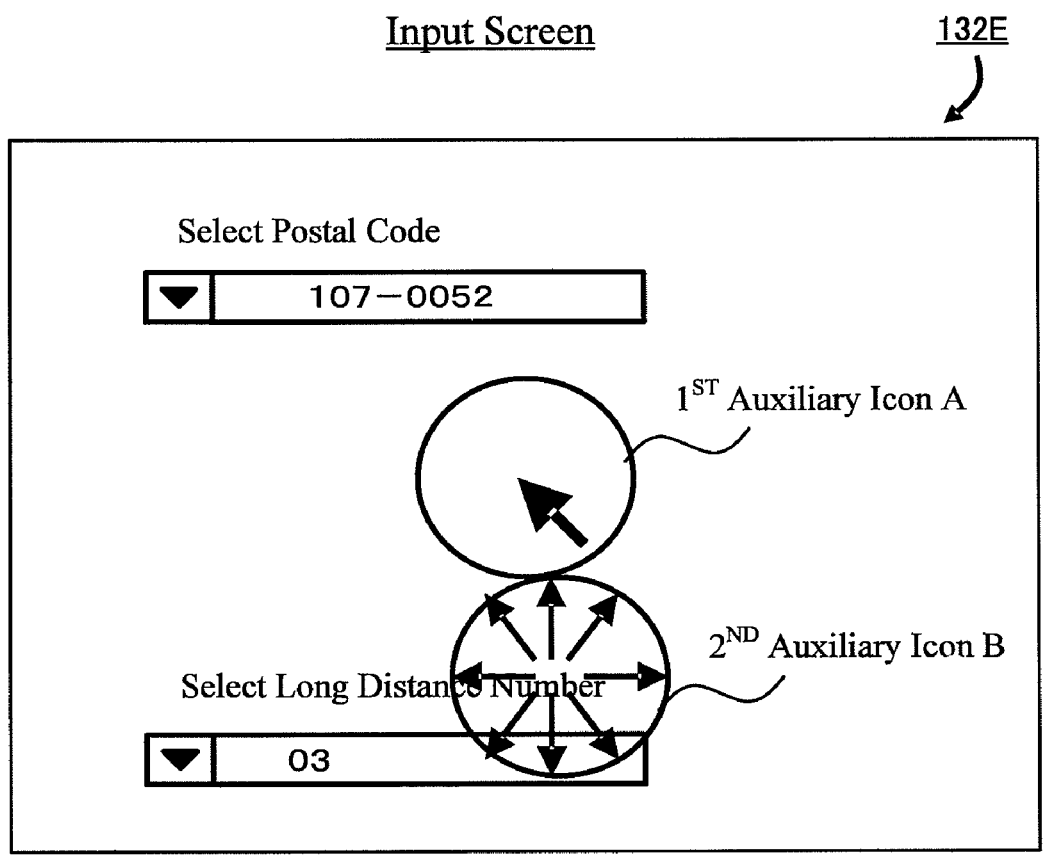
FIG. 8A illustrates an example configuration of an input screen when a movement operation signal is outputted.

Operation signal output unit 114 outputs movement operation signal MS for performing an action corresponding to the movement of a pointer of a typical mouse by performing a "movement operation signal output step" (step 23). For example, referring to input screen 132E shown in FIG. 8A, first and second auxiliary icons A and B move on the display area of display unit 13 following a change in the pressed position (e.g., dragging of second auxiliary icon B) in the state where pressure is already applied to the position on which second auxiliary icon B is displayed (second detection area R2).

When first auxiliary icon A approaches the edge of the touch panel display unit 13 automatically changes the position of second auxiliary icon B so that the entire second auxiliary icon B can be displayed without protruding from the display area. This is because second auxiliary icon B serves to indicate the movable directions of first auxiliary icon A. In addition, when second auxiliary icon is displaced, second auxiliary icon B and first auxiliary icon A remain adjacent to each other. Here, the position on which second auxiliary icon B is displayed can be preferably changed according to a general method of changing the display position.

Figure 8B:
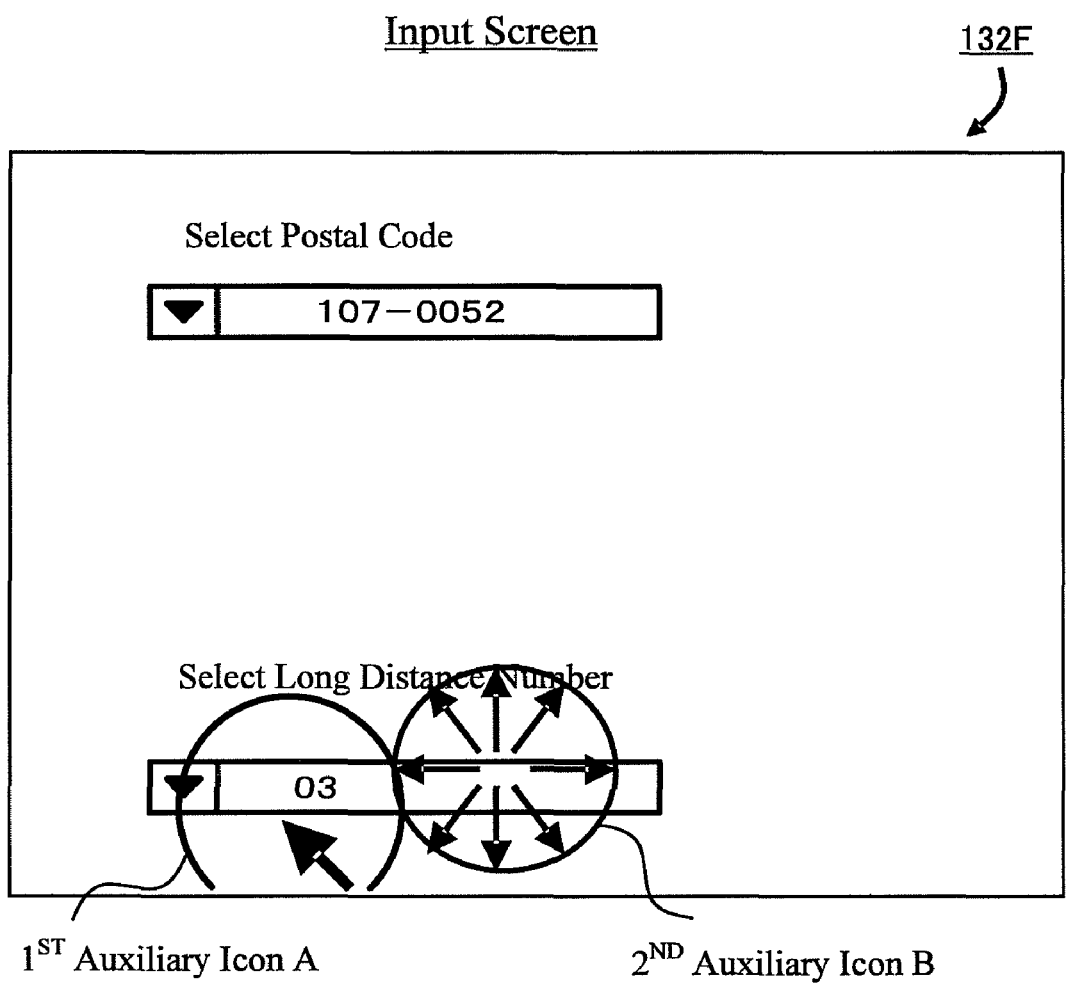
FIG. 8B illustrates an example configuration of an input screen when a display position of a second auxiliary icon is automatically changed in the state where a first auxiliary icon is moved out of a display area.

For example, referring to input screen 132F shown in FIG. 8B, it shall be assumed that first auxiliary icon A is moved to the bottom of the screen of the detection unit 12 (i.e., touch panel) and that second auxiliary icon B is ready to protrude from the display area. In this case, display unit 13 moves second auxiliary icon B into the display area (i.e., the detection area on the touch panel) while holding second auxiliary icon B adjacent to first auxiliary icon A so that the entire second auxiliary icon B can be continuously displayed.

In the meantime, when the pressure-detected position is neither the position on which first auxiliary icon A is displayed (first detection area R1) nor the position on which second auxiliary icon B is displayed (second detection area R2) (No in step 22), control unit 11 terminates the operation-response process.

According to input apparatus 1 of the present invention as set forth above, display unit 13 displays first auxiliary icon A corresponding to first detection area R1 and second auxiliary icon B corresponding to second detection area R2 on the detection area on which detection unit 12 (e.g., a touch panel) detects pressure. In addition, it shall be assumed that the detection unit 12 detects external pressure on at least one of the positions on which first auxiliary icon A is displayed and on at least one of the positions on which second auxiliary icon B is displayed. In this case, operation signal output unit 114 outputs respective operation signals instructing different actions according to the positional relationships of the pressure-detected position in relation with the position on which the respective auxiliary icon is displayed.

As a result, this can increase the number of actions that can be instructed by the operation of the touch panel.

In addition, displaying first auxiliary icon A and second auxiliary icon B helps the user easily identify the area on the touch panel that is supposed to be pressed.

In the present invention, while the actions running inside input apparatus 1 have been described as being realized by a piece of dedicated hardware as described above, they can be realized in a different fashion. Specifically, the actions can also be realized by recording a program for running the actions on a record medium, which can be read by input apparatus 1, reading the program using input apparatus 1, and then running the program. The record medium, which can be read by input apparatus 1, includes but is not limited to portable recording media, such as a floppy disc$^{(R)}$, a magneto optical disc, a Digital Video Disc (DVD), a Compact Disc (CD) and the like, and a Hard Disc Drive (HDD) installed inside input apparatus 1. Here, the program recorded on the record medium can be read, for example, by control unit 11 of input apparatus 1 so as to be processed in the same manner as described above under the control of control unit 11.

Here, the control unit 11 of input apparatus 1 acts as a computer that runs the program read from the record medium on which the program is written.

As an aspect of the present invention, the input apparatus may include a detection position determiner for determining a pressure-detected position, on which the sensor detects pressure and an operation determiner for determining the positional relationship among the pressure-detected position that is determined by the detection position determiner, the display position of the first auxiliary icon and the display position of the second auxiliary icon. The operation signal output unit may output a first operation signal when the operation determiner determines that the pressure-detected position is identical to the display position of the first auxiliary icon.

In the input apparatus of the present invention in the case where the pressure-detected position is two different positions detected by the sensor, the operation signal output unit may output a second operation signal when the operation determiner determines that the two pressure-detected positions are identical to the display position of the first auxiliary icon and the display position of the second auxiliary icon, respectively In the input apparatus of the present invention, the operation signal output unit may output a movement operation signal to move the first auxiliary icon when the operation determiner determines that the pressure-detected position is identical to the display position of the second auxiliary icon.

In the input apparatus of the present invention, in the case where the pressure-detected position is two different positions detected by the sensor, the operation signal output unit may output an icon display end signal when the operation determiner determines that the two pressure-detected positions constitute an area, that excludes the display area of the first auxiliary icon and constitute an area, that excludes the display area of the second auxiliary icon, respectively. The display unit may stop displaying the first auxiliary icon and the second auxiliary icon when the icon display end signal is outputted.

Further, the input apparatus of the present invention may include a detection position number determiner for determining whether or not the number of the detected positions is plural and an icon display determiner for determining whether or not the first auxiliary icon and the second auxiliary icon are displayed. In case where the icon display determiner determines that the first auxiliary icon and the second auxiliary icon are not displayed, the display unit may display the first auxiliary icon and the second auxiliary icon when the detection position number determiner leads to the conclusion that the number of the detected positions is plural.

As another aspect of the present invention, the input method may include determining the pressure-detected position; and determining the positional relationship among the pressure-detected position that is determined by the step of determining the pressure-detected position, the display position of the first auxiliary icon and the display position of the second auxiliary icon. The step of outputting different operation signals may include outputting a first operation signal when the determining the positional relationship of the pressure-detected position determines that the pressure-detected position is identical to the display position of the first auxiliary icon.

In the input method of the present invention, in the case where the pressure-detected position is two different positions detected by the sensor, the outputting different operation signals may include outputting a second operation signal when the determining the positional relationship of the pressure-detected position determines that the two pressure-detected positions are identical to the display position of the first auxiliary icon and the display position of the second auxiliary icon, respectively.

In the input method of the present invention, the outputting different operation signals may include outputting a movement operation signal to move the first auxiliary icon when the step of determining the positional relationship of the pressure detected position determines that the pressure-detected position is identical to the display position of the second auxiliary icon.

In the input method of the present invention, in the case where the pressure-detected position is two different positions detected by the sensor, the outputting different operation signals may include outputting an icon display end signal when the determining of the positional relationship of the pressure-detected position determines that the two pressure-detected positions constitute an area, that excludes the display area of the first auxiliary icon and constitute an area, that excludes the display area of the second auxiliary icon, respectively. The displaying may stop displaying the first auxiliary icon and the second auxiliary icon when the icon display end signal is outputted.

Further, the input method of the present invention may include determining whether or not the number of the detected positions is plural; and determining whether or not the first auxiliary icon and the second auxiliary icon are displayed. In the case where the determining of the positional relationship of the pressure-detected position determines that the first auxiliary icon and the second auxiliary icon are not displayed, the displaying step may display the first auxiliary icon and the second auxiliary icon when the determining whether or not the number of the detected positions is plural leads to the conclusion that the number of the detected positions is plural.

As a further aspect of the present invention, the program may include procedures of: determining the pressure-detected position; and determining the positional relationship among the pressure-detected position that is determined by the procedure of determining the pressure-detected position, the display position of the first auxiliary icon and the display position of the second auxiliary icon. The outputting different operation signals may include outputting a first operation signal when the procedure of determining the positional relationship of the pressure-detected position determines that the pressure-detected position is identical to the display position of the first auxiliary icon.

In the program of the invention, the outputting different operation signals may include outputting a movement operation signal to move the first auxiliary icon when the determining the positional relationship of the pressure-detected position determines that the pressure-detected position is identical to the display position O the second auxiliary icon.

In the program of the invention, in the case where the pressure-detected position is two different positions detected by the sensor, the outputting different operation signals may include outputting an icon display end signal when the determining the positional relationship of the pressure-detected position determines that the two pressure-detected positions constitute an area, that excludes the display area of the first auxiliary icon and constitute an area, that excludes the display area of the second auxiliary icon, respectively. The displaying may stop displaying the first auxiliary icon and the second auxiliary icon when the icon display end signal is outputted.

Further, the program of the invention may include determining whether or not the number of the detected positions is plural; and determining whether or not the first auxiliary icon and the second auxiliary icon are displayed. In the case where the determining of the positional relationship of the pressure-detected position determines that the first auxiliary icon and the second auxiliary icon are not displayed, the displaying procedure may display the first auxiliary icon and the second auxiliary icon when the determining whether or not the number of the detected positions is plural leads to the conclusion that the number of the detected positions is plural.

While the invention has been particularly shown and described with reference to exemplary embodiments thereof, the invention in not limited to these embodiments. It will be understood by those of ordinary skill in the art that various changes in form and details may be made therein without departing from the spirit and scope of the present invention as defined by the claims.

What is claimed is

1. An input apparatus for receiving input data in response to user operation, comprising:
   a sensor for detecting external pressure;
   a display unit for displaying an object icon to be processed in response to pressing on the sensor, a first auxiliary icon corresponding to a first detection area on which the sensor detects the pressure, with the size of the first auxiliary icon greater than that of the object icon, and a second auxiliary icon corresponding to a second detection area, with the size of the second auxiliary icon greater than that of the object icon;
   an operation signal output unit for outputting different operation signals according to a positional relationship between a pressure-detected position, on which the sensor detected the external pressure, and with a display position of the first auxiliary icon and a display position of the second auxiliary icon displayed by the display unit;
   a detection position determiner for determining the pressure-detected position; and
   an operation determiner for determining the positional relationship between the pressure-detected position that is determined by the detection position determiner, and the display position of the first auxiliary icon and the display position of the second auxiliary icon,
   wherein the operation signal output unit outputs a first operation signal upon the operation determiner determining that the pressure-detected position is identical to the display position of the first auxiliary icon and outputs a movement operation signal to move the first auxiliary icon according to the pressure-detected position upon the operation determiner determining that a change has occurred in the condition of the pressure detected position and the pressure-detected position being identical to the display position of the second auxiliary icon, and
   the first auxiliary icon and the second auxiliary icon are brought into contact with each other by their edge.

2. The input apparatus according to claim 1, wherein,
   in the case where the pressure-detected position is two different positions detected by the sensor, the operation signal output unit outputs an icon display end signal upon the operation determiner determining that the two pressure-detected positions constitute an area, that excludes the display area of the first auxiliary icon and constitute an area, that excludes the display area of the second auxiliary icon, respectively, and the display unit stops displaying the first auxiliary icon and the second auxiliary icon upon the icon display end signal being outputted.

3. A method for inputting data into an input apparatus, which has a sensor for detecting external pressure, the method comprising:

displaying an object icon to be processed in response to pressing on the sensor, a first auxiliary icon corresponding to a first detection area on which the sensor detects the pressure, with the size of the first auxiliary icon greater than that of the object icon, and a second auxiliary icon corresponding to a second detection area, with the size of the second auxiliary icon greater than that of the object icon;

outputting different operation signals according to a positional relationship between a pressure-detected position, on which the sensor detected the external pressure and a display position of the first auxiliary icon and a display position of the second auxiliary icon displayed in the displaying;

determining the pressure-detected position; and determining the positional relationship between the pressure-detected position that is determined by the determining of the pressure-detected position, and the display position of the first auxiliary icon and the display position of the second auxiliary icon, wherein the outputting of different operation signals includes outputting a first operation signal upon the determining of the positional relationship of the pressure-detected position determines that the pressure-detected position is identical to the display position of the first auxiliary icon, and includes outputting a movement operation signal to move the first auxiliary icon according to the pressure-detected position upon the determining of the positional relationship of the pressure-detected position determines that a change has occurred in the condition of the pressure detected position and the pressure-detected position being identical to the display position of the second auxiliary icon, and the first auxiliary icon and the second auxiliary icon are brought into contact with each other by their edge.

4. The method according to claim 3, wherein, in the case where the pressure-detected position is two different positions detected by the sensor, the outputting of different operation signals includes outputting an icon display end signal upon the determining of the positional relationship of the pressure-detected position determining that the two pressure-detected positions are an area, that excludes the display area of the first auxiliary icon and an area, that excludes the display area of the second auxiliary icon, respectively, and the displaying stops displaying the first auxiliary icon and the second auxiliary icon upon the icon display end signal being outputted.

5. A non-transitory recording medium having recorded thereon a computer-readable program for running an operation signal output process on a computer, the program comprising:

displaying an object icon to be processed in response to pressing on the sensor, a first auxiliary icon corresponding to a first detection area on which the sensor detects the pressure, with the size of the first auxiliary icon greater than that of the object icon, and a second auxiliary icon corresponding to a second detection area, with the size of the second auxiliary icon greater than that of the object icon;

outputting different operation signals according to a positional relationship between a pressure-detected position, on which the sensor detected the external pressure and a display position of the first auxiliary icon and a display position of the second auxiliary icon displayed in the displaying;

determining the pressure-detected position; and determining the positional relationship between the pressure-detected position that is determined by the determining of the pressure-detected position, and the display position of the first auxiliary icon and the display position of the second auxiliary icon, wherein the outputting of different operation signals includes outputting a first operation signal upon the determining of the positional relationship of the pressure-detected position determining that the pressure-detected position is identical to the display position of the first auxiliary icon, and includes outputting a movement operation signal to move the first auxiliary icon according to the pressure-detected position upon the determining of the positional relationship of the pressure-detected position determining that a change has occurred in the condition of the pressure detected position upon the pressure-detected position being identical to the display position of the second auxiliary icon, and the first auxiliary icon and the second auxiliary icon are brought into contact with each other by their edge.

6. The non-transitory recording medium according to claim 5, wherein, in the case where the pressure-detected position is two different positions detected by the sensor, the outputting of different operation signals includes outputting an icon display end signal upon the determining of the positional relationship of the pressure-detected position determining that the two pressure-detected positions are an area, that excludes the display area of the first auxiliary icon and an area, that excludes the display area of the second auxiliary icon, respectively, and the displaying stops displaying the first auxiliary icon and the second auxiliary icon upon the icon display end signal being outputted.

7. The input apparatus according to claim 1, wherein, the first auxiliary icon is expressed by a circle including a symbol which points out an object that will be selected upon the display position of the first auxiliary icon being pressed; and the second auxiliary icon is expressed by a circle including a symbol which points out movable directions of the first auxiliary icon.

8. The input apparatus according to claim 7, wherein, the symbol that is included in the first auxiliary icon is an arrow whose leading end points out the object that will be selected; and the symbol that is included in the second auxiliary icon is a plurality of arrows which extend outward from the center of the second auxiliary icon.

9. The input apparatus according to claim 1, wherein, the first auxiliary icon or the second auxiliary icon is expressed by a circle or a predetermined diagram.

10. The input apparatus according to claim 1, wherein, the size of the first auxiliary icon or the second auxiliary icon is greater than a finger of the user.

11. The method according to claim 3, wherein the first auxiliary icon is expressed by a circle including a symbol which points out an object that will be selected upon the display position of the first auxiliary icon being pressed; and the second auxiliary icon is expressed by a circle including a symbol which points out movable directions of the first auxiliary icon.

12. The method according to claim 11, wherein,
the symbol that is included in the first auxiliary icon is an arrow whose leading end points out the object that will be selected; and
the symbol that is included in the second auxiliary icon is a plurality of arrows which extend outward from the center of the second auxiliary icon.

13. The method according to claim 3, wherein,
the first auxiliary icon or the second auxiliary icon is expressed by a circle or a predetermined diagram.

14. The method according to claim 3, wherein,
the size of the first auxiliary icon or the second auxiliary icon is greater than a finger of the user.

15. The record medium according to claim 5, wherein,
the first auxiliary icon is expressed by a circle including a symbol which points out an object that will be selected upon the display position of the first auxiliary icon being pressed; and
the second auxiliary icon is expressed by a circle including a symbol which points out movable directions of the first auxiliary icon.

16. The non-transitory recording medium according to claim 15, wherein,
the symbol that is included in the first auxiliary icon is an arrow whose leading end points out the object that will be selected; and
the symbol that is included in the second auxiliary icon is a plurality of arrows which extend outward from the center of the second auxiliary icon.

17. The non-transitory recording medium according to claim 5, wherein,
the first auxiliary icon or the second auxiliary icon is expressed by a circle or a predetermined diagram.

18. The non-transitory recording medium according to claim 5, wherein,
the size of the first auxiliary icon or the second auxiliary icon is greater than a finger of the user.

* * * * *